United States Patent [19]

Hunter et al.

[11] 3,725,425
[45] Apr. 3, 1973

[54] 1,4,5,6-TETRAHYDRO-2-ACETOPYRIDINE, ITS SALTS AND BISULPHITE ADDITION PRODUCTS, AND SYNTHESIS THEREOF

[75] Inventors: Irving R. Hunter, Berkeley; Mayo K. Walden, El Cerrito, both of Calif.

[73] Assignee: The United States of America as represented by the Secretary of Agriculture

[22] Filed: Mar. 29, 1968

[21] Appl. No.: 717,399

[52] U.S. Cl. .................. 260/297 R, 99/91, 99/140 R
[51] Int. Cl. .................................................. C07d 31/32
[58] Field of Search ......................... 260/297; 99/91

[56] References Cited

OTHER PUBLICATIONS

Freifelder, Journal of Organic Chemistry, Vol. 29, pp. 2895–2898, October 1964 QD 241 J6
Quan et al., Journal of Organic Chemistry, Vol 31, pp. 2487–2489, August 1966 QD 241 J6

*Primary Examiner*—Alan L. Rotman
*Attorney*—R. Hoffman, W. Bier and Wan W. Takacs

[57] ABSTRACT

Proline and dihydroxyacetone are reacted in the presence of an alkali metal bisulphite to produce the new compound 1,4,5,6-tetrahydro-2-acetopyridine. This compound, as such, or in the form of its bisulphite complex or its salts, is useful for flavoring bread and other bakery products.

4 Claims, No Drawings

1,4,5,6-TETRAHYDRO-2-ACETOPYRIDINE, ITS SALTS AND BISULPHITE ADDITION PRODUCTS, AND SYNTHESIS THEREOF

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of new organic compounds which are especially valuable for flavoring bakery products. The objects of the invention also include methods for preparing and utilizing these compounds. Further objects of the invention will be evident from the following description wherein parts and percentages are by weight unless otherwise specified.

In the bread-baking industry it is recognized that aroma plays a critical role in the value of the product. Particularly desirable is the appetizing fresh-bread aroma which is prevalent when the product is removed from the oven, but which, unfortunately, is rapidly dissipated when the loaves are cooled and stored. Although much work has been done on this subject, little practical success has been achieved. For example, efforts have been made to isolate the flavor components in the vapors issuing from bread ovens, with the idea of returning the isolate to succeeding dough batches. However, these isolations invariably yield products with a stale or insipid odor, which are of no use for flavor fortification.

A primary object of the invention is the provisions of means for obviating the problems outlined above.

One aspect of this invention concerns the new compound 1,4,5,6-tetrahydro-2-acetopyridine, which has the structure —

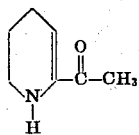

This compound (hereinafter referred to as THP) exhibits an intense aroma like that of freshly-baked soda crackers, and can be used in minor proportions to enhance the flavor of bread and bakery products in general. So used, THP gives the products a very desirable fresh-bread aroma.

THP can be used as such for flavor fortification or it can be used in the form of its derivatives, for example, its bisulphite complex or its salts such as the hydrochloride.

THP is a colorless liquid which undergoes both physical and chemical changes on standing in air. It may, however, be preserved by holding it in sealed vessels under nitrogen or other nonoxidizing gas. Solutions of THP in organic solvents such as pentane remain stable for several weeks. Usually for long storage it is preferred to convert THP into a stable derivative, e.g., the bisulphite complex or a salt. The bisulphite complex—or bisulphite addition product, as it may be called—can be prepared as follows: THP is dissolved in an inert organic solvent such as pentane and the solution is shaken with an equimolar proportion of an alkali metal bi-sulphite in aqueous solution. The aqueous phase is then separated and reduced to dryness, preferably under vacuum, leaving as a residue the THP-bisulphite complex. The salts are prepared in the same manner by substituting an acid for the bisulphite. Usually, hydrochloric acid is employed, but this is by no means critical and one can use other acids such as sulphuric, phosphoric, acetic, citric, fumaric, tartaric, etc. It is, of course, obvious that where the salt is to be used with a food product the acid selected would be one which is non-toxic.

In employing THP for flavor fortification, the compound (or its derivatives) may be incorporated in the dough or may be applied after baking, for example, by spraying the products with a dilute solution or dispersion of the compound in an innocuous liquid carrier. The proportion to be used is not critical and may be varied widely, depending on such circumstances as the degree of flavor enhancement desired, the storage life contemplated, the kind of packaging to be applied to the finished loaves, the type of bread, e.g., white, wheat, raisin, other specialties, rolls, etc. Where incorporation into a dough is to be the mode of application, it is preferred to use a salt of THP, such as the hydrochloride. The bisulphite complex is not preferred for use in doughs because bisulphite ion may be released and interfere with proper dough formation.

It is obvious that THP and its derivatives may be diluted with an edible solid or liquid carrier for incorporation into doughs and bakery products. The carrier may be, for example, sugar, non-fat milk solids, dried whey, salt, gelatin, flour, corn starch, sorbitol, glycerol, an edible oil or fat, water, etc.

The preparation of THP is a simple matter involving but the heating of proline and dihydroxyacetone ($HO—CH_2—CO—CH_2—OH$) in the presence of a bisulphite, at about 80°–100°C. The proportions of proline and dihydroxyacetone are not critical. Usually, it is preferred to use these reactants in equimolar proportions, or preferably 1 to 2 moles of proline per mole of dihydroxyacetone. The presence of the bisulphite in the reaction system is a critical feature of the synthesis, and brings about these advantages: It promotes the formation of THP and suppresses the production of undesired by-products. Moreover, the reaction mass retains a light color, is free from extraneous odorous materials, and THP can be readily isolated from the reaction mixture. Where the bisulphite is omitted the proportion of THP is reduced and it is difficult to isolate from the reaction, which, under such conditions, is a black mass contaminated with reaction products having an undesired peanut-like odor. In particular, it is believed that when the reaction is conducted in the absence of bisulphite, some of the dihydroxyacetone is converted by an internal oxidation-reduction mechanism into two extremely reactive compounds, glyceraldehyde and pyruvaldehyde. These aldehydes react with proline to form compounds which are deeply colored and which have undesirable odors.

In the synthesis of the invention, sodium bisulphite is usually used but other alkali metal bisulphites are suitable. To obtain its reaction-promoting and other desirable effects, the bisulphite is employed in a proportion of at least one mole thereof per mole of dihydroxyacetone. Preferably, one uses an excess, e.g., 2 to 4 moles of bisulphite per mole of dihydroxyacetone. After the reaction is complete—as evidenced by evaporation of the water formed in the reaction--the THP can be readily isolated from the reaction mixture by the following procedure. An alkali is added to the reaction mixture to release THP from its bisulphite addition product. The released THP is then isolated by extraction, taking advantage of the fact that it is soluble in common organic solvents such as pentane, hexane, or other hydrocarbon solvent.

We have further ascertained that THP is present in freshly baked bread and its presence therein may be demonstrated by procedures of extraction and chromatography. However, it is to be emphasized that prior to this invention THP was not known to exist in bakery products, or elsewhere for that matter.

A particular advantage of the invention is that it enables the synthesis of THP in pure form. In this state, THP has high and uniform flavoring power and is free from extraneous substances, so that it can be advantageously used, even in very minor proportion, for the effective flavoring of food products. In the state in which THP exists in extracts of fresh bread, it is too dilute and unstable to be effective for flavoring applications.

The invention is further demonstrated by the following illustrative examples.

EXAMPLE 1 — Synthesis of THP

Sixty grams of sodium bisulfite, 40 g. of proline, and 20 g. of dihydroxyacetone were intimately ground in a mortar. The resultant powder was transferred to a "Teflon"-lined, one-pound-capacity baking pan and heated in an oven at 92° C. for 30 minutes. During the baking period the mixture fused, gradually rose to fill the container, and dried to a porous cake. On cooling, the resulting cake was a yellow friable sinter that had an odor somewhat reminiscent of baked bread or crackers. The sinter, after powdering, could be stored indefinitely in a dry closed container without deterioration. It was used as a convenient starting material for the subsequent separation of the aroma constituent.

Fifty grams (approximately half) of the sinter were dissolved in 100 ml. of water and then cooled in an ice-bath. One hundred milliliters of 4 N NaOH were then added slowly with stirring. The mixture was extracted with three 100-ml portions of pentane. The extracts were combined, boiled for several minutes with 1 g. of decolorizing charcoal, and filtered through "Celite" (a diatomaceous earth filter aid). The resulting sparkling clear, faintly yellow solution was distilled on a waterbath to remove excess solvent. An aliquot of the light amber residue that remained was transferred to a shortpath microdistillation apparatus. The sample was distilled under vacuum while being heated to 85° to 90° C. The material distilled over at 65° to 67° C. at 3 mm. pressure and was collected in a miniature receiver immersed in an ice-water bath. The distillate (300 mg.) was rapidly transferred to small capillary glass tubes, flushed well with nitrogen, and sealed under vacuum. A sample was taken for analysis. Results were as follows: Anal. Found: C, 67.3; H, 8.71. Calcd. for $C_7H_{11}NO$: C, 67.2; H, 8.8. The molecular weight was determined to be 125. The fact that the product was 1,4,5,6-tetrahydro-2-acetopyridine was established by chemical tests and by infrared, Raman, nuclear magnetic resonance, and mass spectra.

EXAMPLE 2 — Preparation of Bisulphite Complex of THP

One hundred mg. of THP were dissolved in 10 ml. of pentane. This solution was shaken with 10-ml. aliquots of 0.5 percent aqueous $NaHSO_3$ solution. After each application of the bisulphite solution (repeated 4 times), the two phases were allowed to separate and the lower (aqueous) phase removed. The aqueous phases were combined and evaporated to dryness under vacuum. The resulting white powder is the THP-bisulphite complex containing excess $NaHSO_3$. It is useful as a stable source of THP, and can be used directly for flavor fortification as illustrated in the next example.

EXAMPLE 3 — Application of Bisulphite Complex of THP

Week-old bread was sprayed with an aqueous solution containing six parts per million of the bisulphite complex. The amount of THP-bisulphite applied was 0.03 mg., or about 0.0006% based on the weight of bread. The bread was allowed to dry in air, then submitted to a panel for evaluation. It was determined that the product had a very desirable fresh-bread aroma.

EXAMPLE 4 — Preparation of THP Hydrochloride

One hundred mg. of THP were dissolved in 10 ml. of pentane. Dry HCl gas was bubbled through the solution. It was noted that a precipitate formed immediately. After several minutes, the addition of HCl was discontinued and the reaction mixture was evaporated to dryness under vacuum. The residue was the desired THP hydrochloride. This salt is hygroscopic; however, the presence of water therein does not interfere with its use.

EXAMPLE 5 — Application of THP Hydrochloride

Aqueous solutions were prepared of the hydrochloride at concentrations of 0.1 percent, 0.01 percent, and 0.001 percent. These solutions were sprayed on small loaves of bread, each weighing about 100 grams. The amounts of THP hydrochloride were 5, 0.5, and 0.05 mg., respectively. The treated loaves and untreated loaves (control) were stored at ambient temperature and evaluated for aroma from time to time. It was found that the loaves sprayed with the hydrochloride maintained a fresh-bread aroma for several days longer than the control loaves.

Having thus described our invention, we claim:

1. A method for preparing 1,4,5,6-tetrahydro-2-acetopyridine in the form of its bisulphite addition product which comprises
   a. heating, at a temperature of about 80°–100° C., a mixture of proline, dihydroxyacetone, and an alkali metal bisulphite,
   b. the amount of said bisulphite being at least one mole thereof per mole of dihydroxyacetone.

2. A method for preparing 1,4,5,6-tetrahydro-2-acetopyridine which comprises -
   a. heating, at a temperature of about 80°–100° C., a mixture of proline, dihydroxyacetone, and an alkali metal bisulphite,
   b. the amount of said bisulphite being at least one mole thereof per mole of dihydroxyacetone,
   c. treating the resulting reaction product with an alkali, and d. extracting 1,4,5,6-tetrahydro-2-acetopyridine from the alkalized reaction product with a volatile hydrocarbon solvent.

3. The sodium bisulphite addition product of 1,4,5,6-tetrahydro-2-acetopyridine.

4. The hydrochloride of 1,4,5,6-tetrahydro-2-acetopyridine.

* * * * *